Sept. 29, 1959 P. G. FRERER ET AL 2,906,329
TIMER
Filed Oct. 12, 1955 6 Sheets-Sheet 1

INVENTORS.
Paul G. Frerer,
BY & Melvin R. Lewis.
Robert L. Kelm
Atty.

Sept. 29, 1959 P. G FRERER ET AL 2,906,329
TIMER
Filed Oct. 12, 1955 6 Sheets-Sheet 2

INVENTORS.
Paul G. Frerer,
BY & Melvin R. Lewis.
Robert L Kahn

Sept. 29, 1959 P. G. FRERER ET AL 2,906,329
TIMER
Filed Oct. 12, 1955 6 Sheets-Sheet 3

INVENTORS.
Paul G. Frerer,
BY & Melvin R. Lewis.
Robert L. Kahn

Sept. 29, 1959 P. G. FRERER ET AL 2,906,329
TIMER
Filed Oct. 12, 1955 6 Sheets-Sheet 4

INVENTORS.
Paul G. Frerer
BY & Melvin R. Lewis.
Robert L. Kahn
ATTY.

Sept. 29, 1959 P. G. FRERER ET AL 2,906,329
TIMER
Filed Oct. 12, 1955 6 Sheets-Sheet 6

INVENTORS.
Paul G. Frerer
BY & Melvin R. Lewis
Robert L. Kahn

United States Patent Office 2,906,329
Patented Sept. 29, 1959

2,906,329

TIMER

Paul G. Frerer and Melvin R. Lewis, Elmhurst, Ill., assignors, by mesne assignments, to Controls Company of America, Schiller Park, Ill., a corporation of Delaware Application October 12, 1955, Serial No. 540,048

19 Claims. (Cl. 161—1)

This invention relates to a timer with a linearly movable adjusting element. The new timer is particularly useful for clothes dryers, although applicable to many other devices.

In such appliances as clothes dryers and the like, timers for controlling the operation of the dryer are essential. As a rule, the casing or housing for the appliance has substantial shallow space adjacent the walls to accommodate a mechanism such as a timer. Those portions of the housing readily accessible to an operator do not as a rule have any deep space extending into the interior of the casing or housing to accommodate mechanism extending for any substantial distance into the interior.

This invention makes it possible to have suitable timing means for controlling an appliance such as a dryer, said timing means requiring minimum depth and extending for a distance parallel to the surface of the housing. A timer of this type can accommodate a straight scale and indicating means in distinction to timers having circular scales and requiring deep space inwardly of the housing wall.

While a timer embodying the invention may be used with electric or gas clothes dryers, it is particularly adapted to control the heavy currents required by electric clothes dryers. It follows, therefore, that a timer embodying the present invention will easily fulfill the less rigorous demands made upon the same by a gas-fired dryer. The timer is useful for other appliances, such as electric stoves.

The invention in general utilizes a clock-driven lead screw as a timing control element. A carriage assembly movable parallel to the lead screw axis is biased to one end position by suitable means. This carriage assembly includes a lead screw engaging member having a range of lost motion relative to the carriage parallel to the lead screw axis and having a range of movement perpendicular to the lead screw axis. The lead screw is turned in a direction to release the carriage for bias response.

The lost motion range of travel is utilized for switch or control action. The motion of the member perpendicular to the screw axis is utilized for coupling or uncoupling to the lead screw, in the latter instance making the carriage manually movable over its range when uncoupled from the lead screw. The lost motion coupling between the member and carriage proper is utilized in connection with carriage detent means for restraining the carriage against responding to its bias in connection with lead screw rotation. Within the limits of the lost motion, means are provided for unlocking the detent means to release the carriage. This carriage release results in a sudden movement of the carriage to take up the lost motion. During the time that the carriage is restrained, the lead screw advances the screw engaging member only. Friction between the members and carriage constitutes the only load on the screw.

Because of this arrangement, the load on the clock motor will always remain low and be restricted to rotating the lead screw slowly. Hence a low power clock motor may be used. The power available for control purposes, however, may be quite large and will be stored in the carriage biasing means. The amount of carriage bias and the length of sudden lost motion travel of the carriage will determine the energy and amount of movement available for switch action.

For a more thorough understanding of the invention, reference will now be made to the drawings, wherein embodiments illustrative of the invention are disclosed and described, it being understood that variations may be made without departing from the scope of the invention except as defined by the appended claims.

Figure 17 is an isometric view of the carriage portions illustrated in Figures 15 and 16.

The timer comprises elongated housing 10 having bottom 11, ends 12 and 13, and sides 14 and 15. The sides and ends of the housing may be of steel, while the bottom may be of insulating material. The parts may be assembled by having tabs on the steel sides pass through apertures in the ends and bottom, the tabs thereafter being twisted. Rigidly secured at one of the housing ends, as for example 13, is clock means generally indicated by 17. Clock means 17 may conveniently consist of any alternating current synchronous type motor having reduction gearing therein and having drive shaft 18 extending through an aperture at end plate 13. Suitable terminals for the windings of the motor are provided.

Rotatively coupled to timing shaft 18 as by a coupling sleeve is timing lead screw 19 having a length extending for the major portion of the housing. Lead screw 19 may be of any suitable material, such as metal or plastic, and is threaded for a major portion of the length thereof. Gap 19a in the thread effectively terminates the timing screw. Timing screw 19 has end 20 suitably journalled in end plate 12. Timing screw 19 will rotate at a relatively low speed, such as, for example, about one revolution per minute.

The pitch of thread on screw 19, the speed of rotation of the same, plus the effective length of screw available for carriage operation will determine the maximum duration of a timer cycle. Thus, for example, a timer may be designed to have a maximum run of about 60 or 70 minutes. If a carriage travel of 4" is provided and if timing lead screw 19 turns at one r.p.m., then a pitch of 15 threads per inch will provide a maximum time duration of one hour. A slower screw rotation, a somewhat longer length of screw or finer pitch or combination thereof will increase the timer run. These figures are suggestive and will vary depending upon the requirements.

For convenience, the housing will be assumed horizontal with wall 11 of the housing at the bottom. The end of the housing toward which the carriage is biased will be referred to as the biased or rest end and the opposite end of the housing will be referred to as the starting end.

Figure 1:
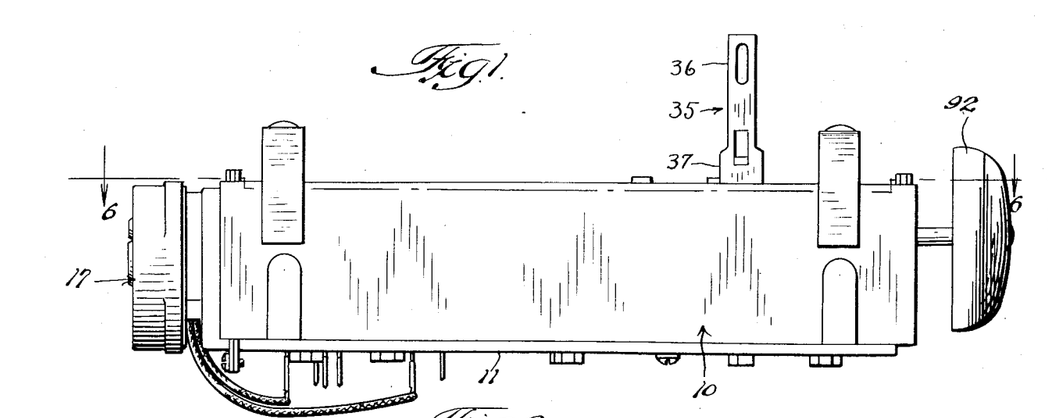
Figure 1 is a side elevation of a timer embodying the present invention.
Figure 2:
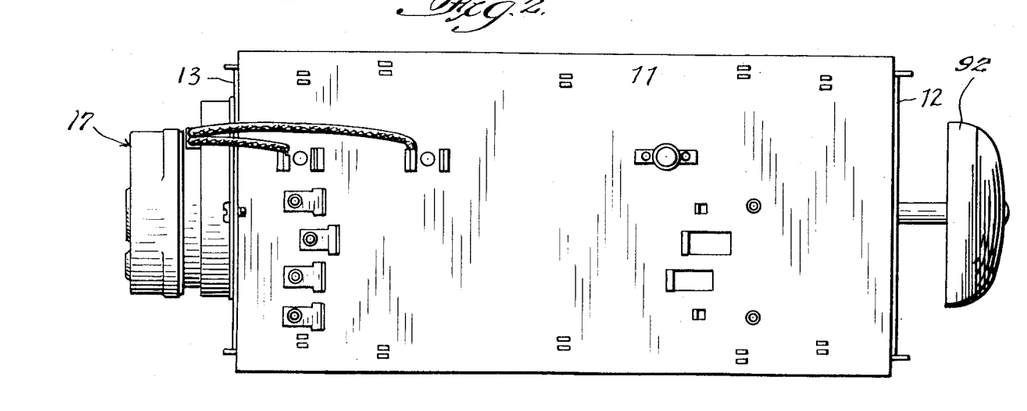
Figure 2 is a bottom view of the timer illustrated in Figure 1.
Figure 3:
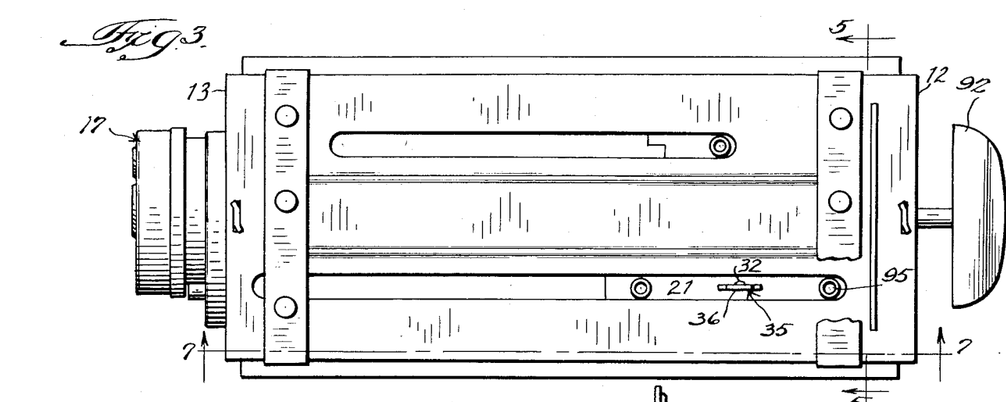
Figure 3 is a plan view of the timer illustrated in Figure 1.
Figure 4:
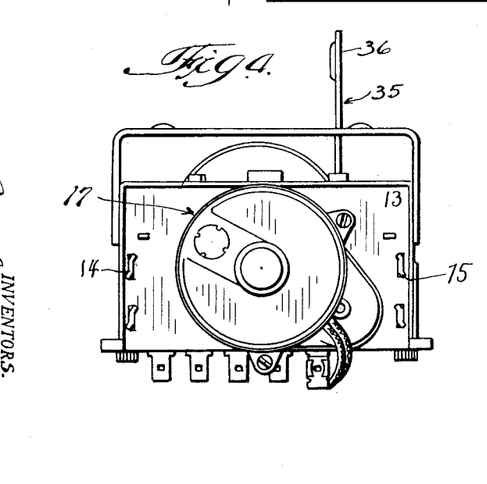
Figure 4 is a view from the motor end of the timer illustrated in Figure 1.
Figure 5:
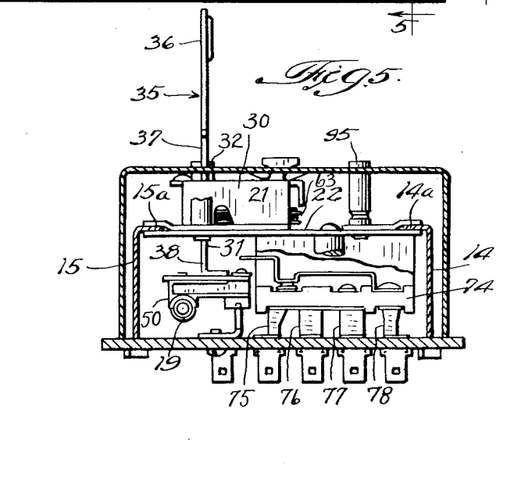
Figure 5 is a section along line 5—5 of Figure 3.
Figure 6:
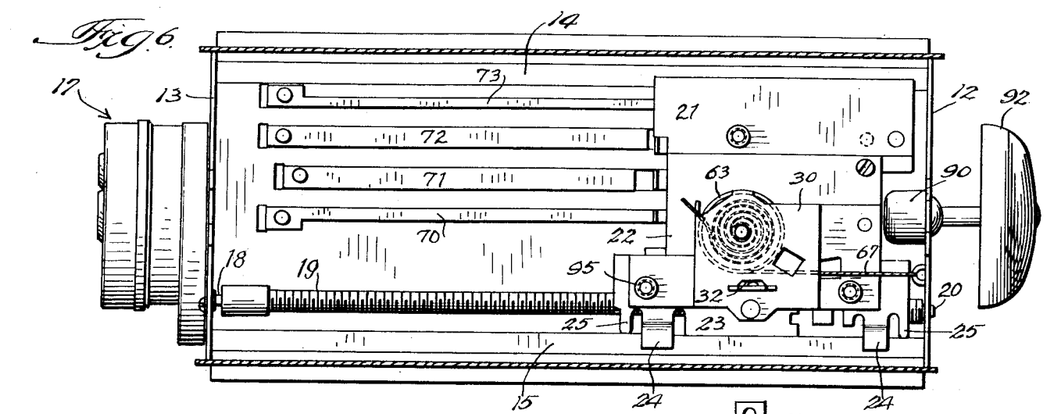
Figure 6 is a section along line 6—6 of Figure 1.
Figure 7:
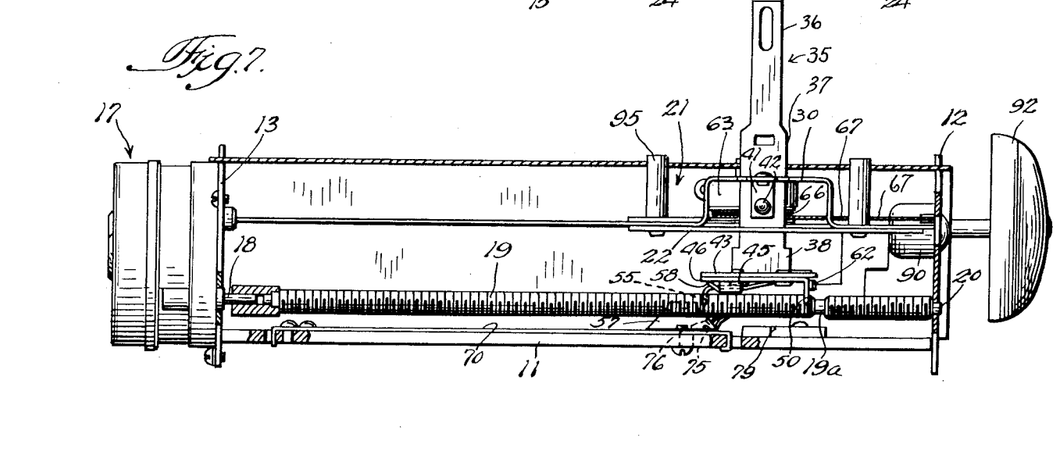
Figure 7 is a section along line 7—7 of Figure 3.
Figure 12:
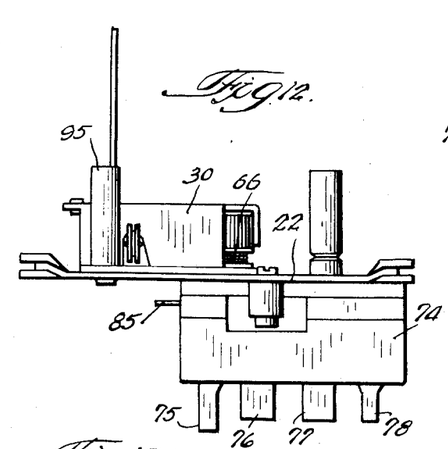
Figure 12 is a detail similar to Figure 11 but showing the carriage from a different angle.
Figure 13:
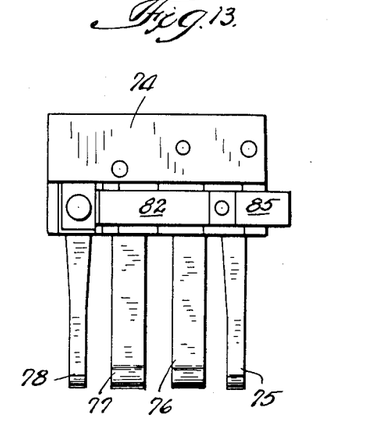
Figure 13 is a detail of the contactor portion of the carriage.
Figure 14:
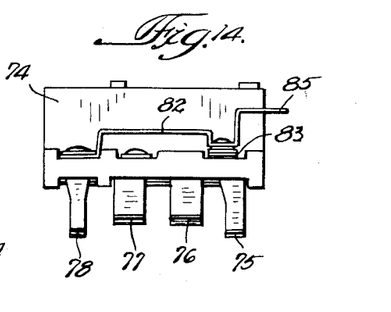
Figure 14 is a view of the contactor illustrated in Figure 13 from a different angle.
Figure 15:
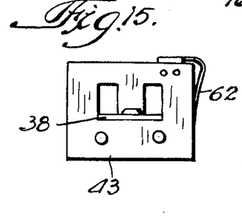
Figure 15 is a detail of a portion of the timer carriage.
Figure 16:
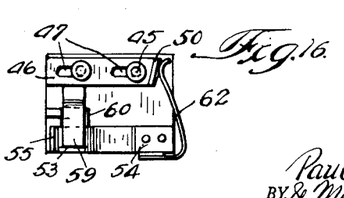
Figure 16 is a bottom view of the part illustrated in Figure 15.
Figure 18:
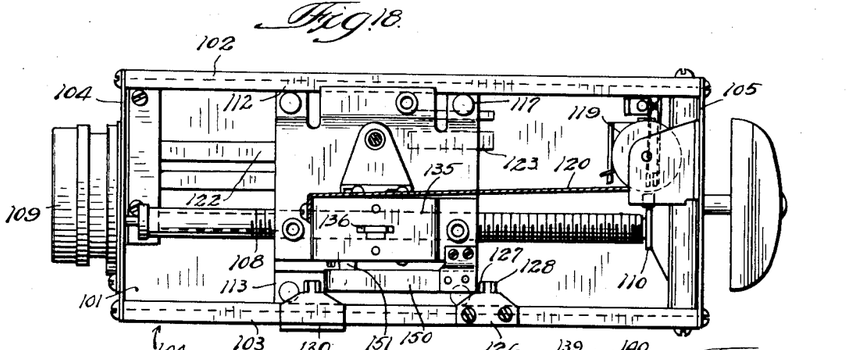
Figure 18 is a plan view of a modified timer.
Figures 19, 22:
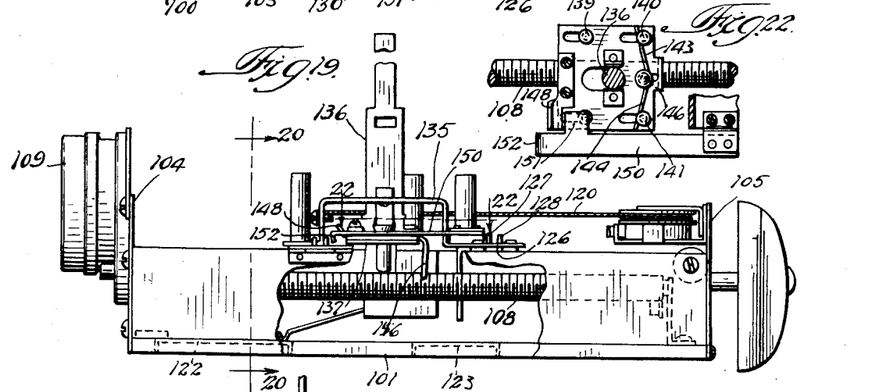
Figure 19 is a side elevation, with certain parts broken away, of the timer illustrated in Figure 18.
Figure 22 is a bottom view of the lost motion portion illustrated in Figure 21.

Supported on the housing is carriage assembly generally indicated by 21. While carriage assembly 21 may be supported in a number of ways, a convenient manner of supporting the same is illustrated in Figures 5, 6 and 12. Sides 14 and 15 of the housing sides have their top edges bent inwardly toward each other to form flanges 14a and 15a. Carriage 21 has main carriage plate 22 provided, at one side, with edge portion 23 and fingers 24 shaped to extend on opposite sides of the housing flange. End fingers 25 engage the very edge of the housing flange. Carriage plate 22 has the other side similarly constructed. Portions 23 and 24 of the carriage plate lock the carriage against movement normal to the carriage plane. Fingers 25 prevent cocking of the carriage around any axis perpendicular to the carriage plane. Thus the carriage is slidingly supported.

Carriage 22 is disposed above lead screw 19. Rigidly secured to the top of plate 22 and generally disposed above lead screw 19 is U-shaped auxiliary support plate 30. Plates 22 and 30 have verically alined elongated slots 31 and 32 in which is disposed for movement along a line generally perpendicular to carriage plate 22 manual control rod 35. Rod 35 has flat handle portion 36, intermediate portion 37 and end portion 38. End portion 38 passes through slot 31 in carriage plate 22, the end portion cooperating with the plate to steady the rod.

Intermediate portion 37 of the control rod is provided with index means to permit the rod to remain in either of two vertically spaced stable positions. The stable positions are the end points of a comparatively short range of travel of rod 35 along a line perpendicular to the carriage assembly. While this index means is not essential, it is convenient and comprises vertically spaced apertures 40 cooperating with spring 41 carried by auxiliary plate 30. Spring 41 has embossing 42 to cooperate with apertures 40 to provide an index action.

Rod 35 carries guide plate 43 parallel to carriage plate 22 and is movable with manual control rod 35 toward and from the carriage plate. Guide plate 43 carries two guide pins 45 alined parallel to the line of carriage travel. Lost motion plate 46 is disposed against guide plate 43, the lost motion plate having slots 47 for accommodating the guide pins. The guide pins are headed to retain the lost motion plate in position. Slots 47 extend parallel to the direction of travel of the carriage plate.

Lost motion plate 46 has its end bent to form finger 50 extending toward lead screw 19. Finger 50 is long enough so that in the down position of rod 35 and guide plate, there will be engagement between finger 50 and the lead screw. Finger 50 has a semicircular edge, shaped to enter into the groove between adjacent threadings of the screw. Thus the finger functions as a mutilated nut for engaging one thread of the lead screw. In the up position of the rod, finger 50 will be clear of the lead screw.

In order to utilize the lost motion for snapping the switch mechanism, guide plate 43 has leaf spring 53 having one end secured at 54 to the guide plate and having the other end 55 bent to form a retaining finger extending toward the bottom of the housing. Carried by bottom 11 of the housing is trip fixture 57 having a number of detents 57a and 57b alined along the direction of carriage travel. As many alined detents may be proprovided as are necessary, depending upon the number of successive switch actuations desired. Thus, for example, in a dryer it will be desirable to cut off heating current one or two minutes prior to the end of the drying operation, after which the motor current is cut off. Detents 57a and 57b cooperate with spring claw 55 to lock the carriage against movement away from the motor end of the housing, assuming that control rod 35 is in the down position. Rotation of the timing screw will result in movement of the lost motion plate.

When claw 55 engages a detent forward movement of the carriage is prevented but continued rotation of the lead screw acts on finger 50 of plate 46 to pull the plate forward against the bias of spring portion 62 projecting from spring 53 (see Figure 17). As plate 46 moves ahead the upper surface and the cam-like finger 58 on the trailing edge of arm 59 projecting from the plate moves under finger 60 projecting from the spring 53. This has a cam action lifting spring 53 until claw 55 is lifted out of the detent so the biasing spring can pull the carriage forward to take up the lost motion. If there is another detent in the path of travel claw 55 will engage it and the action will be repeated; otherwise the continuous motion will be resumed. When the manual control is up the finger 50 does not engage the lead screw.

Means are provided for biasing the carriage proper to move along the threaded rod away from the timing motor. It is understood that the direction of bias is unimportant and the carriage might be biased to move toward the motor. However, it is preferred to bias the carriage in such a direction that rotation of the threaded rod by the motor will permit the carriage to respond to its bias and move toward end 12 of the housing.

The means for biasing the carriage may assume a number of forms. Thus as illustrated, spring reel 63 is mounted between carriage plates 22 and 30. Reel 63 carries pulley 66 cooperating with cable 67 having one end attached to the pulley and the other end rigidly anchored to housing wall 12. Inasmuch as spring-biased reels are well known, no detailed description thereof is deemed to be necessary.

As will be readily apparent, cable 67 will be tensioned by reel 63 so as to pull the carriage toward end plate 12 of the housing. When the lost motion means is operative, only lost motion plate 46 will move with rotation of the timing screw. As a rule, this lost motion may be long enough to provide for definite cam action for switch control to be hereinafter described. Thus the lost motion may have a length of about ¼" to avoid close tolerances. However, the lost motion may be as small or as great as desired. Fixture 57 may have a mounting on base 11 which permits adjustment of the fixture along the line of carriage travel. Thus fine adjustment may be made without requiring precision in the manufacture of the various parts.

Switch means are provided for actuation by the force of carriage movement at the time that the carriage is snapped to take up the lost motion. A number of flat conducting strips 70 to 73, inclusive, are disposed in parallel relation along the housing interior. Thus as illustrated in the drawing, conducting strips 70 to 73, inclusive, are attached to the bottom of the housing. These strips extend from a point on the housing near the motor end of the range of travel of the carriage to suitable points at or near the end of the travel range of the carriage. For convenience, the beginning of the travel range will be assumed to be near the motor end where the carriage is positioned for the longest cycle of operation. The end of the travel range will be assumed to be that end remote from the motor when the carriage has reached the end position in response to its spring bias.

Figure 8:
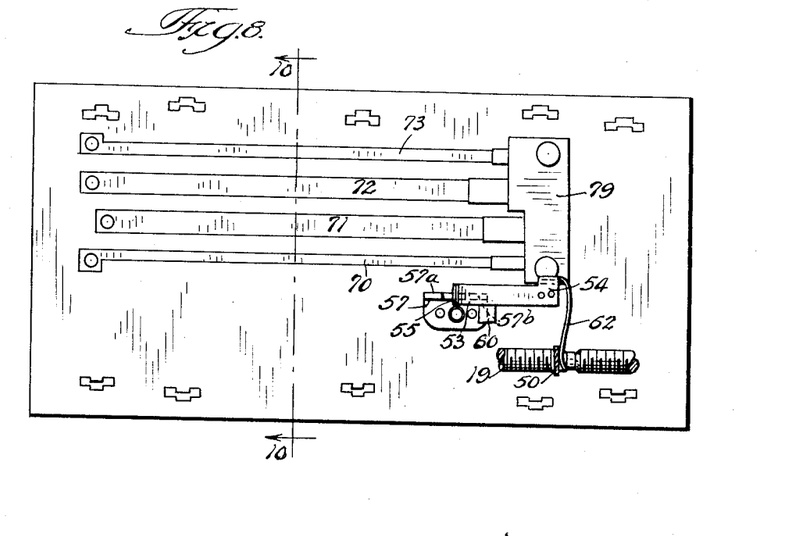
Figure 8 is a plan view of the bottom panel of the timer illustrating modified elongated conducting strips and conducting fingers.
Figures 9, 10, 11:
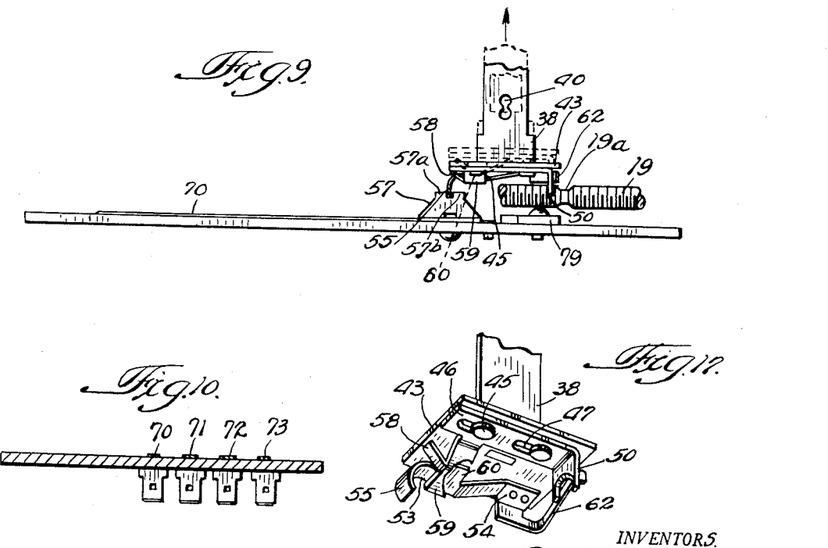
Figure 9 is a side elevation of the bottom panel of the housing and a detail of the lost motion portion of the carriage.
Figure 10 is an end section of the bottom panel of the housing illustrating the terminals at the ends of the elongated conducting strips.
Figure 11 is a detail of a portion of the carriage of the timer.
Figure 11:
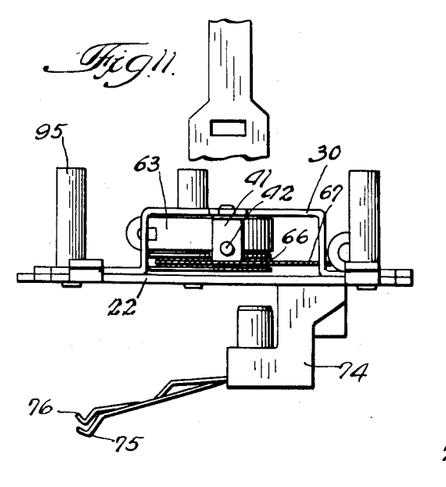

As illustrated in Figure 8, conducting strips 70, 71, 72 and 73 have different lengths. These strips are riveted to base 11 and have their ends turned in to extend through slots in base 11. One end of each conducting strip may be extended to form terminals.

For cooperation with strips 70 to 73, inclusive, carriage 22 is provided with insulating block 74 extending downwardly from the bottom of the carriage and overlying conducting strips 70, 71, 72 and 73. Insulating block 74 carries conducting fingers 75, 76, 77 and 78 for sliding along strips 70, 71, 72 and 73, respectively. Insulating block 79 may be used to terminate the accessible portions of the conducting strips so that fingers 75, 76, 77 and 78 may be elevated clear of the conducting strips when the carriage has reached predetermined end positions.

By correlating the ends of the conductor strips and position when the carriage is snapped and the length of travel during a snapping action, an effective circuit opening movement of the spring fingers along the conductors may be provided and may be used to open circuits carrying substantial power.

The timer may be set by pulling out handle 35, thereby disconnecting the carriage from the lead screw and making it possible to move the carriage either with or against its bias to any desired position along its range of travel. When handle 35 is out, spring claw 53 will clear the detents. It is desirable to provide means for opening all electrical circuits controlled by the timer when the manual control is pulled outwardly to set the timer. This may be accomplished by having insulating block 74 provided with movable switch finger 82 cooperating with fixed contact 83.

Finger 82 may be electrically connected to finger 78 by a rivet. Fixed contact 83 is electrically connected to one of the contact fingers, in this case contact finger 75. Movable contact finger 82 is normally closed against fixed contact 83 when manual control 35 is pushed in for connecting the carriage to the timing lead screw. However, finger 82 has end portion 85 reaching in over and electrically insulated from guide plate 43 so that when plate 43 is raised for disengaging the carriage from screw 19, finger 82 will be pulled away from contact 83.

Additional switches may be provided at or near end 12 of the housing to be operated by the carriage. The carriage need not necessarily carry switch fingers and may operate stationary switches.

Bumper means are provided in the housing adjacent end 12 thereof for taking up the shock of the carriage in the event that the manual control is in the "up" position and is released so that the carriage will slide swiftly to its biased position. This bumper means may consist of rubber block 90 suitably supported on end plate 12.

It is clear that the spring take-up reel may be disposed on housing end 12 and the dead end of the cable may be attached to the carriage.

Suitable terminal lugs for connecting the various switch contacts may be provided. These terminal lugs may be in the form of prong members for plugging into suitable socket members as desired.

Means are provided for sounding an alarm when the timer reaches the end of its timing cycle. While various means may be provided, such as, for example, a continuously electrically energized gong, the circuit of which would be closed by the carriage when the carriage has reached the end position, a simple construction generally similar to that used in typewriters may be used. Thus bell 92 is secured to any suitable portion of the housing, such as, for example, end wall 12. Any suitable striker may be carried by the carriage and so designed that the gong will be struck when the carriage reaches its final position. The carriage itself may have a number of support members 95 extending upwardly therefrom and adapted to carry either a suitable pointer or scale for indicating the condition of the timer.

Referring now to Figures 18 to 22, inclusive, there is shown a modification wherein the detents for cooperation with the carriage-supported spring portion claw are secured in such manner as to be movable to an inoperative position. Thus such a modified structure may have a number of separate detents which may be moved into or out of operative position and the entire timer be adapted to control the cycling of a device, such as, for example, an automatic washing machine or an electric stove. By controlling the operability of the various detents, various parts of an operating cycle may be modified and a flexible control be provided.

The construction illustrated in the modification is generally similar to the structure previously described in regard to the housing, timing motor and timing screw. Thus the housing generally indicated by 100 has bottom panel 101, side panels 102 and 103, respectively, and end panels 104 and 105. Timing lead screw 108 is provided, the lead screw having one end connected to the shaft of timing motor 109 and having the other end supported by bracket 110.

Sides 102 and 103 of the housing may be formed of thick material, such as, for example, plastic, and the sides are provided with slots 112 and 113, respectively, on the inside surfaces of the sides and adjacent the free edges thereof. The carriage generally indicated by 115 has carriage plate 116 shaped so that certain fingers ride in slots 112 and 113 of the housing sides. Guide members 117 may be disposed in the four corners of the carriage plate, these guide members providing cylindrical rollers dimensioned to engage the inside surfaces of the housing sides for steadying the carriage.

Any other means of mounting the carriage to be movable along the housing may be provided. In the modification illustrated here, spring-biased reel 119 is secured to the housing as at end 105, the reel having cable 120 extending to the carriage and serving to bias the carriage toward end plate 105.

Bottom panel 101 of the housing has a number of electrical conducting strips disposed therein, such as, for example, 122 and 123. These conducting strips may be longitudinally displaced so that, if desired, conducting strips 122 and 123 illustrated in Figure 19 may be in the same longitudinal path of the housing but spaced along the path of travel of the carriage so that conducting strip 122 will be engaged by a brush and thereafter the same brush may be used for conducting strip 123. As many conducting strips may be provided as are necessary, such conducting strips being provided laterally displaced from each other and longitudinally displaced from each other in any desired pattern.

Figure 20:
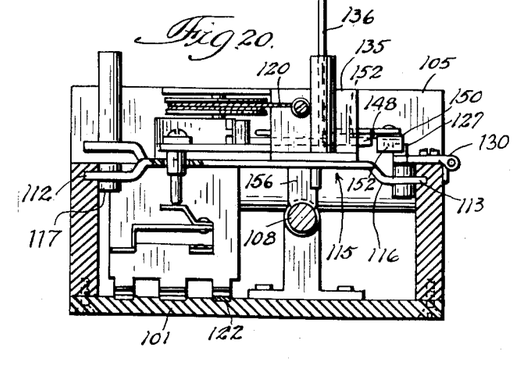
Figure 20 is a section on line 20—20 of Figure 19.
Figure 21:
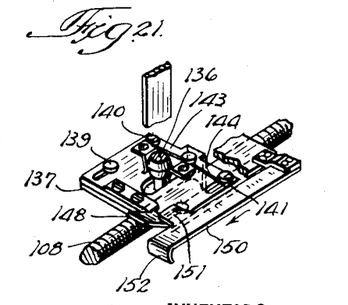
Figure 21 is a perspective detail of the lost motion portion of the carriage of the modified timer.

The detents for cooperating with the carriage to temporarily lock a portion of the carriage against movement are here shown as being secured on the free edge of one of the housing sides, 103. Detent 126 consists of a metal plate having a pair of fingers 127 and 128, each of which functions as a detent. Plate 126 is here shown as being attached to the free edge of side 103 and is not adapted for being moved. Additional detent plate 130 also having a number of detent teeth is provided. Plate 128 as illustrated in Figure 20 is hingedly secured so that the plate and the detent teeth may be moved out of the way of the spring claw supported on the carriage. Instead of a hinge mounting, it is possible to mount the detent plate so that the same may be moved below or above the line of travel of the claw. As many detent plates as may be required may be provided. Instead of having a detent plate, each tooth may be carried independently of the other teeth and hingedly secured.

It is, of course, possible to provide a movable mounting for the detent teeth in the modification previously described in connection with Figures 1 to 17, inclusive. Thus the detent teeth in that modification may be pulled below the level of the bottom plate or may be moved laterally out of the way of spring claw 53. However, the detent mounting illustrated in Figures 18 to 22, inclusive, is more susceptible to control from the top or front of the timer.

Because of the location of the detents above carriage plate 116, the lost motion mechanism is disposed above the carriage plate rather than below it, as previously described. The mechanism is generally similar to the one previously described. Carriage plate 116 has U-shaped auxiliary plate 135. Plates 116 and 135 are suitably apertured to accommodate manual control rod 136. This control rod is movable vertically, i.e., normal to plates 116 and 135, and has suitable index means to maintain the control rod in either of two positions. Rigidly attached to rod 136 is guide plate 137 disposed between plates 116 and 135. Guide plate 137 carries headed pins 139 to 141, inclusive, extending upwardly therefrom. Lost motion plate 143 rests on guide plate 137 and has suitable slots for accommodating the pins and control rod. Lost motion plate 143 is movable for a limited distance along the carriage travel path and is biased to the position illustrated in Figure 22 by spring 144. The bias of lost motion plate 143 is in the direction opposite to the bias of the carriage due to cable 120. Spring 144 is effective only when the manual control rod is in a position so that the carriage is freely movable along the housing. In such condition, spring 144 positions the lost motion plate correctly so that the carriage may be re-engaged with the lost motion plate at the desired end of its range Lost motion plate 143 carries finger 146 suitably shaped to engage the threading on lead screw 108. Finger 146 extends through a slot in carriage plate 116, the slot being long enough to permit the finger to move with the lost motion plate. Finger 146 is on the leading side of the carriage with reference to bias responsive carriage travel. Lost motion plate 143 also carries cam finger 148 extending upwardly and rearwardly of plate 143. Cooperating with cam finger 148 is spring arm 150 having one end rigidly secured to the leading side of carriage plate 116 and extending rearwardly along the lost motion plate. Spring arm 150 has lateral finger 151 overlying the lost motion plate and cooperating with cam finger 148. Spring arm 150 also has claw end 152 for cooperation with the detents carried by plates 126 and 128. Spring arm 150 normally tends to drop claw 152 as low as possible. When manual control rod 136 is in its lower position, claw 152 will travel with the carriage in a path including the detents. When control rod 136 is in the upper position, claw 152 will be clear of the detents and the carriage can be moved freely, except for the bias of the spring reel.

The operation of the carriage and lost motion plate is similar to that previously described. When the carriage advances by rotation of the lead screw so that claw 152 engages a detent, then further carriage movement ceases. However, lost motion plate 143 advances sufficiently so that cam 148 can elevate claw 152 and release the carriage for sudden take-up of the lost motion.

The timers illustrated and described utilize some means for biasing the carriage toward an end position. The energy for sudden movement of the carriage is the potential energy obtained when the carriage is prevented from moving in response to its bias in connection with the lost motion travel. Such a construction is highly desirable, as has been heretofore pointed out, because of the light loading of the means for driving the timing screw, such as, for example, a timing motor.

It is possible, however, to eliminate the carriage biasing means, such as spring-biased reels, and utilize stored energy obtained from the timing motor. This may be accomplished by omitting the spring-wound reel in the timers illustrated in the drawing and instead providing a powerful bias spring for the lost motion plate.

Thus in the form of the invention illustrated in Figures 1 to 17, inclusive, spring 62 is used to preposition the lost motion plate with respect to the carriage. Spring 144 in the modification illustrated in Figures 19 and 22, inclusive, is similarly used for prepositioning purposes. If the spring-wound reel is omitted and instead spring 62 or spring 144, as the case may be, is greatly increased in power, then it will be clear that the timing screw may be driven in such a direction as to store energy in these two springs when the carriage is stopped and that the screw moves the carriage up to the detent. The direction of rotation and direction of carriage travel will remain the same as disclosed herein. It may be desirable to increase the lost motion range of travel to permit a suitable storage of energy.

What is claimed is:

1. A timer comprising a rotatable lead screw, a carriage movable along a line parallel to the lead screw axis, a part supported by said carriage for engaging the threads of said lead screw, lost motion means for mounting said part on said carriage so that the two are relatively movable for a limited distance along the line of carriage travel, detent means for locking said carriage against lead screw directed movement toward one end position, means for releasing said detent means when said part has moved a predetermined distance with respect to said carriage within said lost motion range, means effective on release of said detent means for moving said carriage with respect to said part through said predetermined distance, and means for utilizing the last named carriage movement for control purposes.

2. The timer according to claim 1, wherein said means effective on release of said detent means for moving said carriage includes a spring, said spring functioning to move said carriage at a speed faster than lead screw directed movement of said carriage.

3. The timer according to claim 2, wherein electric switch means are provided, at least certain of said switch means having one setting during lead screw directed carriage movement and adapted to have its setting changed upon carriage movement when said detent is released.

4. The timer according to claim 3, wherein the spring means for moving said carriage on release of said detent means is disposed on said carriage and couples said thread-engaging part to said carriage.

5. A timer comprising a lead screw adapted to be driven, a carriage movable along a line parallel to the lead screw axis, a part carried by said carriage for engaging the threads of said lead screw, said screw being adapted to turn in a direction to drive said carriage toward one end position, lost motion means for mounting said thread-engaging part on said carriage so that the two are relatively movable for a limited distance along the line of carriage travel, means for biasing said part with respect to said carriage so that said part normally is at the end of its travel range furthest said one carriage end position, said part and carriage being relatively movable for a limited distance along the line of carriage travel, detent means for locking said carriage against lead screw directed movement toward said one end position, means for releasing said detent means when said part has moved a predetermined distance with respect to said carriage within said lost motion range, said carriage taking up its lost motion suddenly when said motion travel of said carriage for effecting a control action.

6. The timer according to claim 5, wherein means are provided for mounting said part carried by said carriage so that said part is movable to a thread-disengaging position whereupon said carriage is manually movable in either direction.

7. A timer comprising a lead screw adapted to be driven, a carriage movable along a line parallel to the lead screw axis, means for biasing said carriage toward one end position, said carriage being movable against its bias toward its other end position, a part carried by said carriage for engaging the threads of said lead screw, said screw turning in a direction to permit said carriage to respond to its bias, lost motion means for mounting said part on said carriage so that the two are relatively movable for a limited distance along the line of carriage travel, detent means for locking said carriage against lead screw directed movement toward said one end position, means for releasing said detent means when said part has moved a predetermined distance with respect to said carriage within said lost motion range, said carriage taking up its lost motion suddenly when said detent means is released, and means actuated by said sudden lost motion travel of said carriage for effecting a control action.

8. The timer according to claim 7, wherein means are provided for mounting said part carried by said carriage so that said part is movable to a thread-disengaging position whereupon said carriage may be manually moved in either direction.

9. A timer comprising a motor-driven lead screw, a carriage movable along a line parallel to the lead screw axis and adapted to be coupled to said screw, means for biasing said carriage toward one end position, said carriage being movable against its bias toward its other end position, said lead screw turning in a direction to permit said carriage to respond to its bias, a part carried by said carriage and including a finger for engaging the thread of said lead screw, said part including a handle, means for mounting said part on said carriage so that said finger is movable toward or away from said lead screw for engagement or disengagement respectively, said part mounting means including lost motion means so that said part is relatively movable to the carriage for a limited distance along the line of carriage travel, fixed stop means for said carriage effective to stop said carriage when said carriage has reached a predetermined position in response to its bias and under the control of said lead screw and means for disabling said stop after said part has moved through a predetermined portion of its lost motion range, said carriage moving swiftly in response to its bias to take up said lost motion, electric switch means, and means for operating said switch means during said swift carriage movement.

10. A timer comprising a housing, a lead screw journalled in said housing, means for rotating said lead screw at a predetermined rate, a carriage slidably supported on said housing for movement along a line parallel to the lead screw axis, spring means for biasing said carriage toward one end position, a part carried by said carriage for engaging a thread of said lead screw, said lead screw rotation permitting the carriage to respond to its bias, means for mounting said part on said carriage so that it is movable to and from said lead screw, means for mounting said part so it is movable for a limited distance along a line parallel to the lead axis, detent means supported on said housing, a locking member carried by said carriage for cooperation with said detent means to lock the carriage against travel in lead screw controlled movement in response to its bias, means for unlocking said locking member after said lead screw has caused said thread-engaging part to advance less than said limited distance with respect to the carriage, said carriage upon unlocking suddenly moving to take up the lost motion between the carriage and the part supported by said carriage, electric switches and means carried by said carriage for operating said switches when said carriage travels, said switch-operating means being timed so that said carriage operates said switches while said carriage moves suddenly.

11. The timer according to claim 10, wherein manual means are provided for moving said thread-engaging part to and from said lead screw, said carriage being manually movable along its path of travel when said carriage is disengaged from said lead screw, switch means directly actuated by said manual control, said last-named switch means being adapted to be used for opening a power circuit when said manual control is moved to a disengaging position.

12. A timer comprising a housing, a lead screw journalled in said housing, means for rotating said lead screw at a predetermined rate, a carriage assembly slidably supported on said housing for movement along a line parallel to the lead screw axis, spring means for biasing said carriage toward one end position, said carriage being movable to the other end position as a starting point for initiating a maximum duration timing cycle, a plate forming part of said carriage assembly, means for supporting said plate on said assembly for movement along a line perpendicular to the axis of the lead screw, means for supporting said plate on said assembly for providing lost motion along a line parallel to the lead screw axis, a member carried by said plate for engaging the lead screw thread, said member being movable to a disengaging position when said plate is moved perpendicularly to the lead screw axis, a detaining member carried on said carriage assembly, means on said housing for cooperation with said detaining member to lock the carriage from lead screw controlled movement at a predetermined point on the path of said carriage, means for unlocking said carriage after said plate has been advanced by the lead screw in the engaged position for a distance within the limit of the lost motion range whereupon said carriage is free to move in response to its bias, electric switching means in said housing, said switching means being adapted to remain in one condition when said carriage is moving in response to its bias and under the control of said lead screw, and means for utilizing the sudden movement of said carriage after it is unlocked for effecting a change in the condition of said switching means.

13. The construction according to claim 12, wherein said housing contains a plurality of spaced electrically conducting strips parallel to the axis of said lead screw, contact fingers supported by said carriage for cooperation with said conducting strips and wherein the points along the carriage path where said carriage is first locked and then unlocked registers generally with the ends of said conducting strips, the lost motion of said carriage being sufficiently great so that the spring fingers are quickly moved with the carriage beyond the conducting strip ends.

14. A timer comprising a housing, a lead screw journalled in said housing, means for rotating said lead screw at a predetermined rate, a carriage slidably supported on said housing for movement along a line parallel to the lead screw axis, spring means for biasing said carriage toward one end position, said carriage being movable to its other end position as the starting point for a maximum duration timing cycle, a plate disposed on said carriage, means for supporting said plate to provide for a limited movement of said plate along a line perpendicular to the lead screw axis, a finger carried by said plate for cooperation with said lead screw, said finger in one plate position engaging at least one thread of said lead screw to be coupled thereto and in the other position of said plate to be in a disengaged position, means providing lost motion of said plate with respect to said carriage along a line parallel to the lead screw axis, a detaining member on said carriage, means on said housing for engaging said detaining member at predetermined positions along the path of travel of said carriage, said carriage being locked to a stationary position when said detaining member is operative, cam means on said plate for moving said detaining means to an unlocking position after said plate has had some lost motion, said carriage upon release suddenly moving in response to its bias to take up said lost motion, electric switching means to be operated by said timer and means for operating said switching means from said carriage during the sudden movement of said carriage.

15. The timer according to claim 14, wherein an auxiliary switch is disposed on said carriage, means for connecting said auxiliary switch to said switching means, and means for changing the condition of said auxiliary switch with movement of said plate during engagement or disengagement of said member and lead screw.

16. The construction according to claim 14, wherein the means for biasing said carriage comprises a spring reel and cable extending between said one end of the housing and said carriage.

17. A timer comprising a housing, a lead screw journalled in said housing, means for rotating said lead screw at a predetermined rate, a carriage supported on said housing for sliding movement along a line parallel to the lead screw axis, spring means for biasing said carriage toward the one end of said housing to an extreme position corresponding to a maximum duration timing cycle, a plate on said carriage, said plate having a finger extending toward said lead screw and adapted to engage said lead screw, means for mounting said plate on said carriage so that said plate has a limited range of movement toward and away from said lead screw for controlling the engagement of said finger with said lead screw, lost motion means for mounting said plate on said carriage to provide movement parallel to the lead screw axis, a hooked member on said carriage, means at predetermined positions on said housing for engaging said hooked member when said plate is in a screw-engaging position, cam means movable with said plate for moving said hooked member to an unlocking position after said plate member has advanced within the range of its lost motion, and electric switching means actuated by said carriage in timed relation to the sudden carriage movement.

18. The construction according to claim 17, wherein said means on said housing for engaging said hooked member includes a detent finger.

19. The construction according to claim 18, wherein said detent finger has means for supporting the same on the housing so that said detent finger may be moved to a position clear of the path of said hooked member.

References Cited in the file of this patent
UNITED STATES PATENTS

| | | |
|---|---|---|
| 2,048,439 | Fairchild | July 21, 1936 |
| 2,501,274 | Hamilton | Mar. 21, 1950 |
| 2,556,095 | Loewenstein | June 5, 1951 |
| 2,641,661 | Puerner et al. | June 9, 1953 |

UNITED STATES PATENT OFFICE
CERTIFICATE OF CORRECTION

Patent No. 2,906,329                                September 29, 1959

Paul G. Frerer et al.

It is hereby certified that error appears in the printed specification of the above numbered patent requiring correction and that the said Letters Patent should read as corrected below.

Column 8, line 66, after "when said" insert -- detent means is released, and means actuated by said lost --.

Signed and sealed this 26th day of April 1960.

(SEAL)
Attest:

KARL H. AXLINE
Attesting Officer

ROBERT C. WATSON
Commissioner of Patents